United States Patent
Bachmann et al.

(10) Patent No.: US 6,779,836 B2
(45) Date of Patent: Aug. 24, 2004

(54) GUIDE MECHANISM FOR A COVER OF A SLIDING/TILTING ROOF

(75) Inventors: Hubert Bachmann, Dannstadt (DE); Edgar Weiss, Alzenau (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/649,178

(22) Filed: Aug. 27, 2003

(65) Prior Publication Data

US 2004/0041444 A1 Mar. 4, 2004

(30) Foreign Application Priority Data

Sep. 3, 2002 (DE) .......................................... 102 40 638

(51) Int. Cl.⁷ ................................................ B60J 7/057
(52) U.S. Cl. ................................. 296/216.08; 296/223
(58) Field of Search ........................... 296/213, 216.08, 296/221–224

(56) References Cited

U.S. PATENT DOCUMENTS

| | | | |
|---|---|---|---|
| 4,671,565 A | | 6/1987 | Grimm et al. |
| 5,730,487 A | * | 3/1998 | Hausrath ..................... 296/223 |
| 5,899,524 A | | 5/1999 | Mori et al. |
| 5,906,412 A | * | 5/1999 | Matsumura .................. 296/223 |
| 6,024,404 A | | 2/2000 | Stallfort et al. |
| 6,290,289 B1 | * | 9/2001 | Ohtsu et al. ................. 296/221 |

FOREIGN PATENT DOCUMENTS

| | | |
|---|---|---|
| EP | 0 517 318 A1 | 12/1992 |
| EP | 0 802 077 A | 10/1997 |
| EP | 1 070 615 A1 | 1/2001 |
| EP | 1 195 281 A1 | 4/2002 |

OTHER PUBLICATIONS

European Search Report, dated Nov. 20, 2003.
Search report, Austrian Patent Office, dated Oct. 24, 2002.

* cited by examiner

Primary Examiner—Dennis H. Pedder
(74) Attorney, Agent, or Firm—Carlson, Gaskey & Olds

(57) ABSTRACT

A guide mechanism for a cover of a sliding/tilting roof has at least one lateral profiled rail, at least one bearing part each provided along the profiled rail for shifting the cover and at least one intermediate part which is connected with the bearing part and at least indirectly mechanically coupled to the cover. The intermediate part, for instance a slotted guide or a guiding part, has an extension which projects into the profiled rail, blocking the intermediate part from moving outside the profiled rail. The connection between the bearing part and the intermediate part is therefore additionally locked.

18 Claims, 4 Drawing Sheets

GUIDE MECHANISM FOR A COVER OF A SLIDING/TILTING ROOF

REFERENCE TO RELATED APPLICATIONS

The present invention claims the benefit of German Patent Application No. 102 40 638.3, filed Sep. 3, 2002.

TECHNICAL FIELD

The present invention relates to a guide mechanism for a cover of a sliding/tilting roof having at least one profiled rail, at least one bearing part displaceable along the profiled rail for shifting the cover, and at least one intermediate part which is connected with the bearing part and at least indirectly mechanically coupled to the cover.

BACKGROUND OF THE INVENTION

There are known guide mechanisms for a cover of a sliding/tilting roof having at least one profiled rail, at least one bearing part displaceable along the profiled rail for shifting the cover, and at least one intermediate part connected with the bearing part and at least indirectly mechanically coupled to the cover. A guide mechanism of this type is described in DE 44 05 742 C1, for example, or in DE 195 14 585 A1. Usually, profiled rails are arranged to the side of the cover, and at least two bearing parts run in each profiled rail, namely a so-called front sliding shoe and a so-called rear sliding shoe, with the terms "front" and "rear" being related to the state of the bearing parts when installed in the vehicle and to the longitudinal direction of the vehicle. The front bearing part forms the swivel bearing of a slotted guide (in the form of a lever) with a lateral guide track.

Preferably, the slotted guide is directly coupled to the cover. A further intermediate part engages into the guide track formed in the slotted guide and is connected with the rear sliding shoe. The rear sliding shoe is usually moved through a cable guided to be resistant to buckling. A nose on the intermediate part projects into the guide track and, during shifting of the rear sliding shoe, causes the slotted guide to swivel and hence causes the cover to swivel in order to, for example, raise the cover or, prior to its shifting, to lower it at the rear end. The bearing parts ideally have various properties so that they, on the one hand, slide in the profiled rails in a maintenance-free manner and, on the other, have high enough stability so that they are able to introduce the force acting on them via the extension, for instance during shifting, into the profiled rail. Good properties in terms of sliding quality and strength, however, are contradictory to some extent. This is the reason why hitherto there are injection-molded parts made of several components which on the one hand provide for good sliding quality and on the other for high stability.

SUMMARY OF THE INVENTION

The invention provides a guide mechanism which has a simple and cost-effective construction and is distinguished by a small space and a very good transfer of force from the intermediate part into the profiled rail. This is achieved in a guide mechanism of the type mentioned above in that the intermediate part and the bearing part are directly connected with each other and the intermediate part has an extension which is located within the profiled rail and is prevented by the profiled rail from leaving the same. Thus, the profiled rail represents a type of blocking means for the extension in the profiled rail. With this, however, it is possible that the bearing part has inferior properties in terms of strength, because the profiled rail itself defines a mechanical locking means for the protrusion.

The mechanism according to the invention makes it possible to also introduce forces from the extension largely directly into the profiled rail and to essentially place only a compressive load on the bearing part, which preferably is a plastic part. This allows a simpler and cost-effective design of the bearing part.

According to one embodiment, the profiled rail is formed in a C-shape and encompasses the bearing part together with the extension. Through the opening of the C-shape, the intermediate part is able to extend toward the cover. The at least indirect mechanical coupling means that the intermediate part is in the path of flux of force between the bearing part and the cover. However, the invention also provides an immediate coupling between the intermediate part and the cover.

Relating to the installed condition, the profiled rail locks the extension to the intermediate part in vertical direction, i.e., in the direction in which very large forces are exerted on the intermediate part and the extension when moving. The bearing part has a recess which is open in the vertical upward direction for receiving the extension of the intermediate part. The extension is blocked from leaving the recess by the rail.

The guide mechanism according to one embodiment of the invention further allows construction of the bearing part and/or the intermediate part as a single-component plastic part. Even the extension can be integrally formed on the intermediate part and designed from plastic. The inventive structure therefore eliminates the need to use two-component plastic pieces. Instead, it is possible through the invention to allocate the various demands to the material properties of the individual parts. For example, in one embodiment, the bearing part is made of a plastic material with good sliding quality, whereas to intermediate part and the extension are made of a material which has correspondingly good properties in terms of strength. Due to the modularity of the invention, the parts can also be standardized in a simple manner, by, for instance, having the possibility of using identical intermediate parts with different guide rails and designing only the bearing part so as to be adapted to the guide rail.

In one embodiment, the intermediate part is a slotted guide that is mounted for swiveling motion in the bearing part via the extension; however, it may also be, for instance, a guiding part fastened to the rear sliding shoe, the shifting of which brings about a swiveling motion of the slotted guide. In this case, the intermediate part couples the bearing part with the slotted guide.

At least one nose can be integrally formed on the intermediate part which couples the bearing part with the slotted guide, this nose projecting into the guide track, already mentioned above, in the slotted guide.

BRIEF DESCRIPTION OF THE DRAWINGS

Further features and advantages will be apparent from the following description and from the following drawings to which reference is made and in which.

DETAILED DESCRIPTION OF THE EMBODIMENTS

Figure 1:
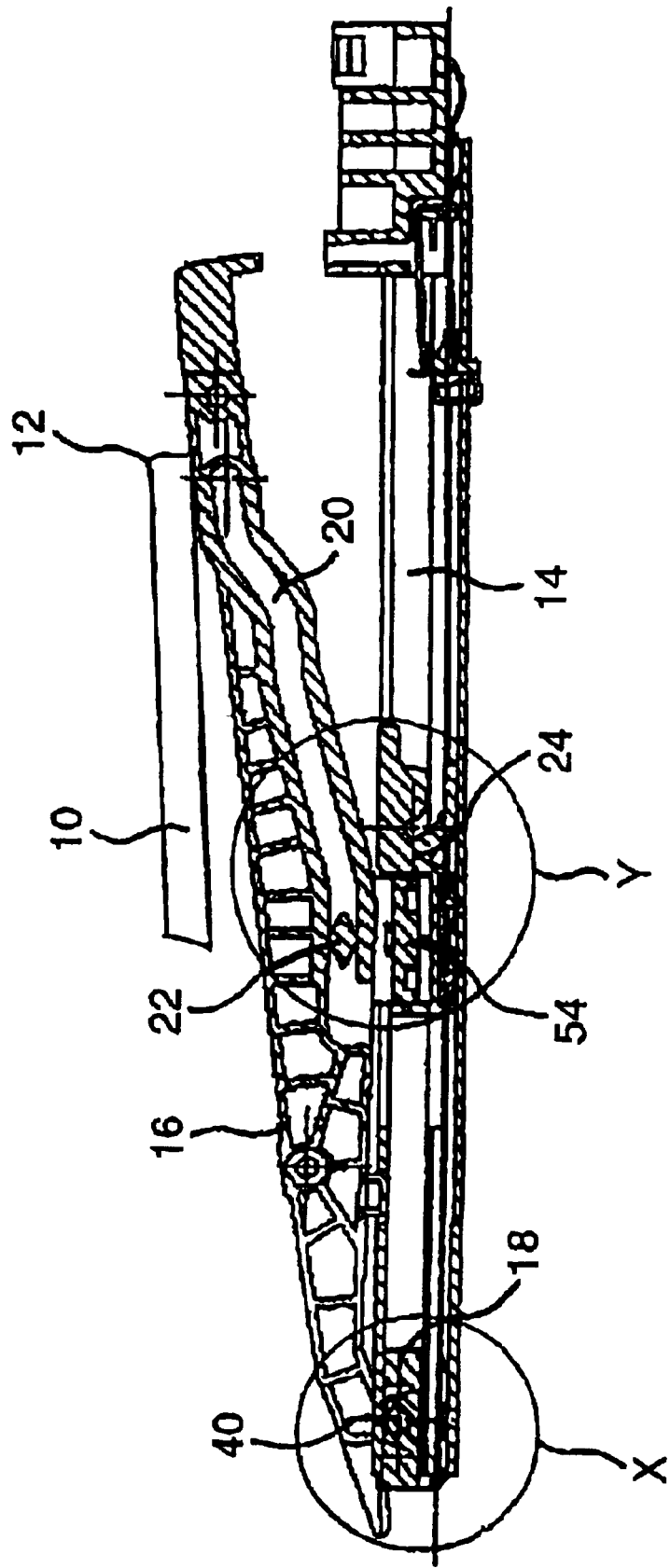
FIG. 1 shows a partial sectional side view of the guide mechanism in accordance with the invention.

FIG. 1 illustrates one embodiment of the inventive guide mechanism for a cover 10 of a sliding/tilting roof of a vehicle shown in a view from the side of the vehicle. The guide mechanism brings the cover 10 into the different positions, namely into the raised position (shown in FIG. 1), into the closed position (also referred to as initial position), and into the retracted position in which the cover is moved to the rear to dive under the roof. To move the cover to the rear, the rear edge 12 of the cover has to be lowered, as is generally known.

The guide mechanism is designed to be essentially identical on both sides of the cover 10; for this reason the guide mechanism is illustrated in FIG. 1 on one side only for clarity. The guide mechanism comprises a C-shaped profiled rail 14, which is rigidly fastened to an edge of a roof opening. A lever in the form of a slotted guide 16 is coupled to the cover 10 and received at the front end for swiveling motion in a front bearing part 18. The slotted guide 16, which may act as an intermediate part, has a guide track 20 on each of its two side faces, with both guide tracks 20 having identical designs so that it is sufficient to illustrate only one of them. Running inside each guide track 20 is a sliding block in the form of a nose 22 adapted to be shifted by means of a rear bearing part 24.

In the following, the guide mechanism in the area of the front and rear bearing parts 18 and 24, respectively, will be explained in more detail.

The front bearing part 18, also called a front sliding shoe, is made of a single-component plastics material which shows good sliding quality and low wear. It preferably is an injection-molded part made of POM C9021M (Ticona).

Figure 3:
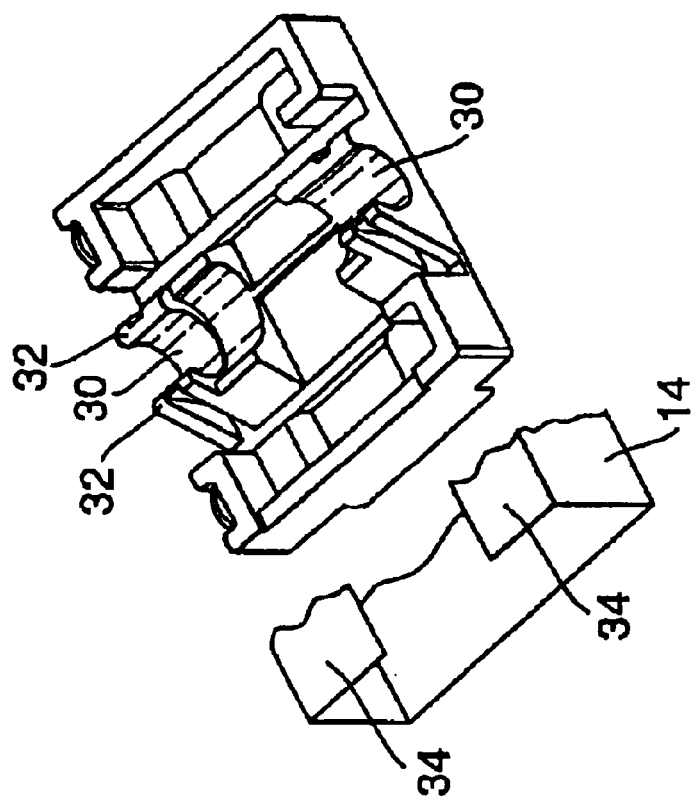
FIG. 3 shows a perspective top view onto the front bearing part.

The front bearing part 18 is completely received in the interior of the profiled rail 14 and can be shifted along the latter. On its upper side, the front bearing part 18 has a C-shaped recess 30 on each of its sides, which are formed between two hook-shaped extensions 32. The recesses 30 are situated below the upper cross-webs 34 of the profiled rail 14 (see FIG. 3).

The slotted guide 16 likewise is a single-component injection-molded part, in which the special attention is focused on the strength. Possible plastics materials can be, for example, may include PA6.6 CP20 or some other similar material. In the area of the front end of the slotted guide 16, extensions 40 are fanned on both sides and are integrally connected with the remainder of the slotted guide 16. These stud-like extensions 40 are latched into place in the recesses 30 from above and are partially encompassed by the hook-shaped extensions 32 (see FIG. 2). A latching connection is therefore farmed between the slatted guide 16 and the front bearing part 18.

Figure 2:
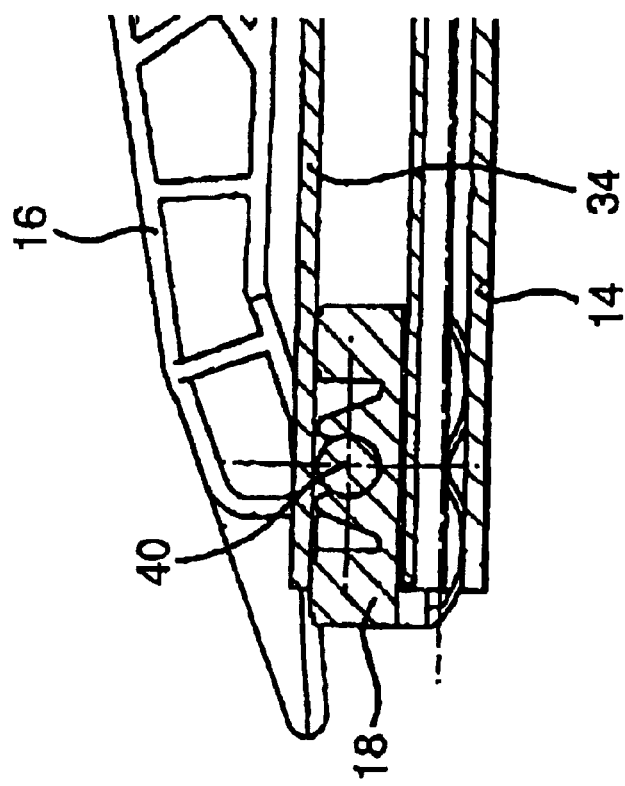
FIG. 2 shows an enlarged view of the area referenced by X in FIG. 1.
Figure 4:
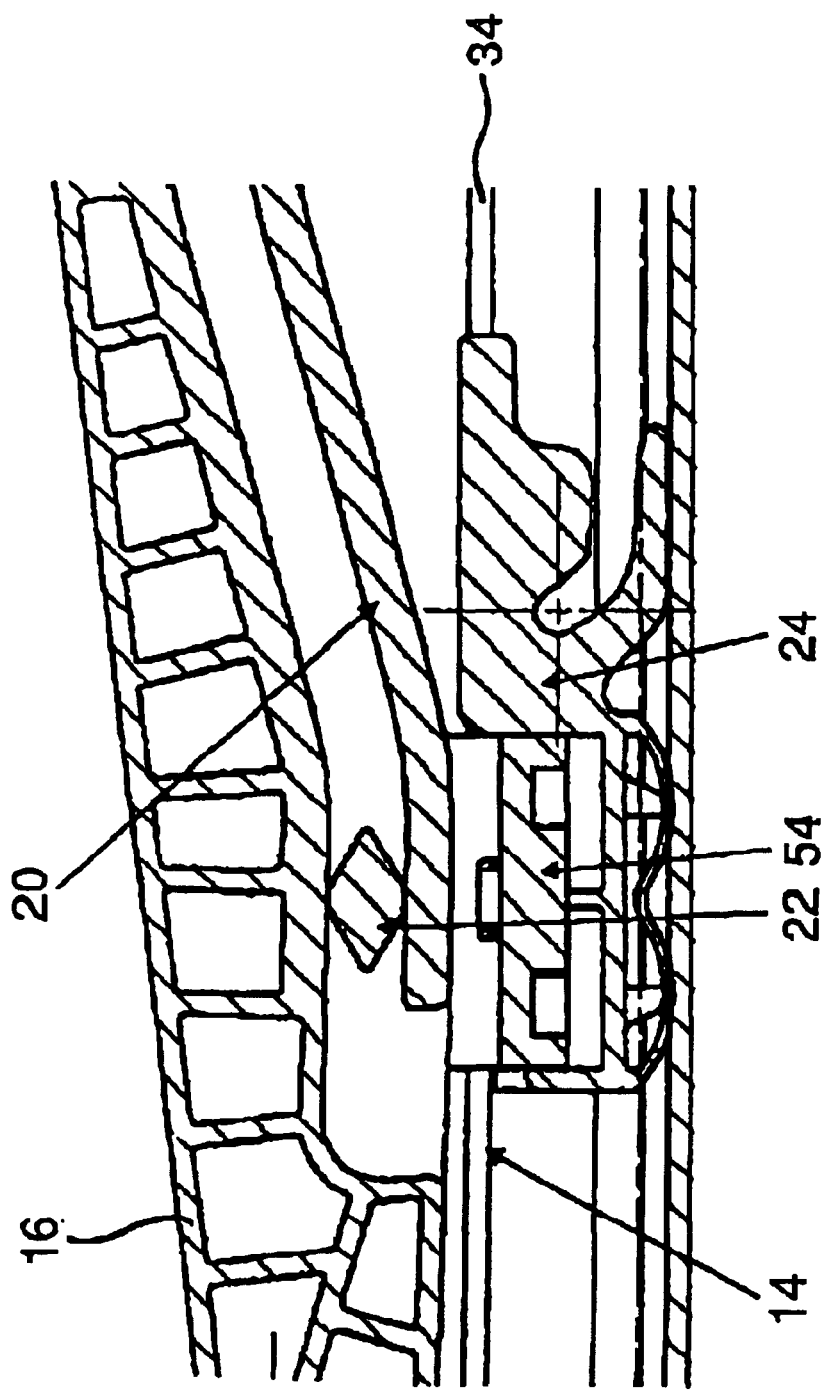
FIG. 4 shows an enlarged view of the area referenced by Y in FIG. 1.

In the state when the front bearing part 13 and the slotted guide 16 are connected to each other, the front bearing part 18 and the slotted guide 16 are pushed into the profiled rail 14 from an open end. As shown in FIG. 2, both extensions 40 define a guide axis that lies completely within the profiled rail 14 and directly underneath the webs 34. With this, the profiled rail 14 surrounds both the front bearing part 18 and the extensions 40 and prevents the extensions 40 from disengaging from the recesses 30 on exertion of, for example, a force directed vertically upwards. Hence, the profiled rail 14 serves as a positive locking means between the slatted guide 16 and the front bearing part 18.

The sliding properties are provided by the bearing part 18, while the high strength properties are fulfilled by the slotted guide 16 and the formed-on extensions 40. When a force is directed upwards into the slotted guide 16, the slatted guide 16 is able to introduce the force directly into the profiled rail 14, bypassing the front bearing part 18 so that there is an essentially zero tensile load introduced into the front bearing part 18. It, on the other hand, a force which is directed vertically downwards is exerted on the slotted guide 16, then this will result in pure compressive loads in the plastic material of the front bearing part 18, which, unlike tensile loads, is not problematic for the plastic material.

The rear bearing part 24, also called a rear sliding shoe, is likewise a singe-component injection-molded part with good sliding quality, and preferably of the same material as the front bearing part 18. Fastened to the rear bearing part 24 is a drive cable 50 through which the shifting of the rear bearing part 24 is brought about. The cable 50 is accommodated in a guide chamber 52 formed in the profiled rail 14. The fastening to the rear bearing part 24 is effected, for instance, via a tail seal as is described in DE 201 11 621.

The rear bearing part 24 carries a guide part 54, which is likewise a single-component injection-molded part, that can be made from the same material as the slotted guide 16, for example. At each of its sides, the guide part 54 has two projecting extensions 56 which can be inserted from above into upwardly open recesses 58 in the rear bearing part 24. Hooks 60 provided on the guide part 54 serve to latch the guide part 54 in place after the guide part 54 is pushed into the rear bearing pan 24, and for the mutual fastening of the parts in the pre-assembled state, as long as these parts are not yet inserted in the profiled rail 14.

Figure 6:
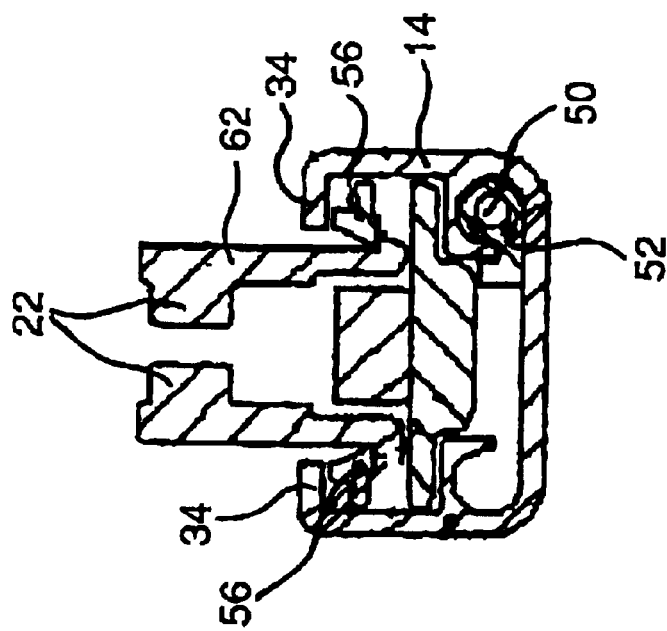
FIG. 5 shows a perspective view of the rear bearing part together with the intermediate part and FIG. 6 shows a sectional view taken through the guide rail and the rear bearing part together with the intermediate part.
Figure 5:
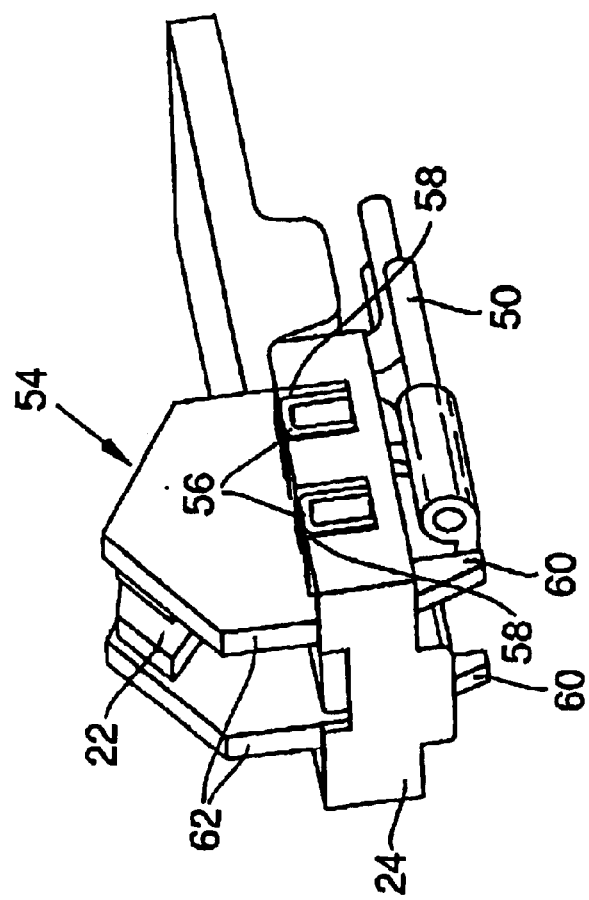

As shown in FIG. 6, the profiled rail 14 also helps lock the guide part 54 and the rear bearing part 24 together because the cross-webs 34 of the profiled rail 14 lie directly above the extensions 56 and because the extensions 56 are hilly located within the profiled rail 14. According to the connection of the front hearing part 18 with the slotted guide 16, each extension 56 in this case will be prevented by the profiled rail 14 from coming out of the corresponding recess 58. Two legs 62 of the guide part 54 project from the profiled rail 14 between the cross-webs 34. Each leg 62 has an inwardly oriented nose 22 which is integrally formed on each leg 62 as a sliding block. Each nose 22 projects into its associated guide track 20.

During shifting of the bearing part 24, the noses 22 likewise travel in the horizontal direction to the front or to the rear in their guide track 20. When the bearing part 24 is shifted to the rear, with respect to FIG. 1, the slotted guide 16 and the cover 10 will swivel in a downward direction.

If it is desired to shift the cover 10 to the rear, the noses 22 are moved to the rear end of their guide tracks 20 so that the rear edge 12 of the cover 10 is lowered. At this point) the cover 10, the slotted guide 16, the guide part 54 and the front and rear bearing parts 18, 24 can be shifted to the rear.

The advantages of the guide mechanism described in the introductory portion of the specification relate, as stated, to both the front and rear bearing parts 18 and 24, respectively. The slotted guide 16 or the guide part 54 only need to be operatively coupled to the front and rear bearing parts 18, 24 and need not be directly coupled to the front and rear beading parts 18, 24, making it possible to interpose other parts in the structure. For this reason, the disclosure generally describes a structure having one intermediate part each, which is received in the front and rear bearing parts 18, 24 and locked by the profiled, rail 14, even though more intermediate parts are possible. Note that the intermediate part does not necessarily have to comprise the extension 40, 56; the same applies for the front and rear bearing parts 18, 24 and the corresponding recesses 30, 58. A reverse construction would also be conceivable within the scope of the invention.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A guide mechanism for a cover of a sliding/tilting roof, comprising:
    at least one lateral profiled rail;
    at least one bearing part displaceable along the profiled rail for shifting the cover; and
    at least one intermediate part connected to the bearing part and operatively coupled to the cover, the intermediate part having an extension received in a recess in the bearing part and maintained in the recess by the profiled rail, wherein the recess opens in a vertically-upward direction.

2. The guide mechanism as claimed in claim 1, wherein the profiled rail is formed in a generally C-shape and encompasses the bearing part and the extension.

3. The guide mechanism as claimed in claim 1, wherein the profiled rail locks the extension to the intermediate part in a vertical direction in an installed condition.

4. The guide mechanism as claimed in claim 1, wherein at least one of the bearing part and the intermediate part is a single-component part.

5. The guide mechanism of claim 4, wherein the single-component part is made of plastic.

6. The guide mechanism as claimed in claim 1, wherein the extension is integrally farmed on the intermediate part.

7. The guide mechanism as claimed in claim 1, wherein the extension and the bearing part are coupled to each other via a latching connection.

8. The guide mechanism as claimed in claim 7, wherein the latching connection is locked by the profiled rail.

9. The guide mechanism as claimed in claim 1, wherein the intermediate part comprises a slotted guide mounted for swiveling motion in the bearing part via the extension.

10. The guide mechanism as claimed in claim 1, further comprising a slotted guide coupled to the cover, and wherein the bearing part is a rear bearing part that causes a swiveling motion of the slotted guide and therefore the cover, wherein the intermediate part couples the rear bearing part with the slotted guide.

11. The guide mechanism as claimed in claim 10, wherein at least one nose is integrally formed on the intermediate part and projects into a guide track in the slotted guide.

12. A guide mechanism for a cover of a sliding/tilting roof, comprising:
    at least one lateral profiled rail;
    at least one bearing part displaceable along the profiled rail for shifting the cover, the bearing part having at least one upwardly open recess; and
    a slotted guide mounted for swiveling motion to the bearing part and operatively coupled to the cover, the slotted guide having an extension integrally formed on the slotted guide and received in the recess, wherein the extension is held within the recess by the profiled rail.

13. The guide mechanism as claimed in claim 12, wherein the profiled rail is formed in a generally C-shape and encompasses the bearing part and the extension.

14. The guide mechanism as claimed in claim 12, wherein at least one of the bearing part and the slotted guide is a single-component part.

15. The guide mechanism of claim 14, wherein the single-component part is made of plastic.

16. The guide mechanism as claimed in claim 14, wherein the extension and the bearing part are coupled to each other via a latching connection that is locked by the profiled rail.

17. The guide mechanism as claimed in claim 12, wherein the bearing part is a front bearing part, and wherein said at least one bearing part further comprises a rear bearing part that causes a swiveling motion of the slotted guide and therefore the cover, and wherein the guide mechanism further comprises an intermediate part carried on the rear bearing part, wherein the intermediate part couples the rear bearing part with the slotted guide.

18. The guide mechanism as claimed in claim 17, wherein at least one nose is integrally farmed on the intermediate part and projects into a guide track in the slotted guide.

* * * * *

UNITED STATES PATENT AND TRADEMARK OFFICE
CERTIFICATE OF CORRECTION

PATENT NO. : 6,779,836 B2
DATED : August 24, 2004
INVENTOR(S) : Bachmann et al.

It is certified that error appears in the above-identified patent and that said Letters Patent is hereby corrected as shown below:

Column 5,
Line 44, "farmed" should read as -- formed --.

Column 6,
Line 46, "farmed" should read as -- formed --.

Signed and Sealed this

Thirtieth Day of November, 2004

JON W. DUDAS
*Director of the United States Patent and Trademark Office*